(12) United States Patent
Monden (10) Patent No.: US 8,730,424 B2
(45) Date of Patent: May 20, 2014

(54) DISPLAY APPARATUS

(75) Inventor: Takuya Monden, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 762 days.

(21) Appl. No.: 12/931,687

(22) Filed: Feb. 8, 2011

(65) Prior Publication Data

US 2011/0249212 A1    Oct. 13, 2011

(30) Foreign Application Priority Data

Apr. 9, 2010   (JP) ................. 2010-090222

(51) Int. Cl.
*G02F 1/1333*   (2006.01)
*G02F 1/13*     (2006.01)
*G09F 9/00*     (2006.01)
*F16M 11/00*    (2006.01)

(52) U.S. Cl.
CPC ... *G02F 1/13* (2013.01); *G09F 9/00* (2013.01); *F16M 11/00* (2013.01)
USPC ........................................ 349/58

(58) Field of Classification Search
USPC ........................................ 349/58
See application file for complete search history.

(56) References Cited

U.S. PATENT DOCUMENTS

| 7,139,062 | B2 * | 11/2006 | Saitoh ............. | 349/161 |
| 7,384,179 | B2 * | 6/2008 | Sakai ............. | 362/632 |
| 2007/0222912 | A1 * | 9/2007 | Sato et al. ........ | 349/58 |
| 2009/0103000 | A1 | 4/2009 | Monden et al. | |
| 2009/0128733 | A1 | 5/2009 | Teramoto | |

FOREIGN PATENT DOCUMENTS

| JP | 2006-290960 | 10/2006 |
| JP | 2009-116297 | 5/2009 |
| JP | 2009-128399 | 6/2009 |

\* cited by examiner

*Primary Examiner* — Eric Wong
(74) *Attorney, Agent, or Firm* — Oblon, Spivak, McClelland, Maier & Neustadt, L.L.P.

(57) ABSTRACT

A display apparatus is provided which realizes high display quality without inclusion of bubbles when a protective cover is bonded over the display surface of the display panel with a transparent adhesive sheet therebetween. A display surface of a display panel and a protective cover are bonded with first and second transparent adhesive sheets. The first transparent adhesive sheet has a cross-sectional area vertical to the thickness direction that is formed smaller than the opening area of an opening of a frame, and it is provided within the opening. Then, a bonding member is charged into a gap formed by the frame, display panel, first transparent adhesive sheet, and second transparent adhesive sheet, so as to bond the frame, display panel, first transparent adhesive sheet, and second transparent adhesive sheet.

7 Claims, 3 Drawing Sheets

DISPLAY APPARATUS

BACKGROUND OF THE INVENTION

1. Field of the Invention

The present invention relates to display apparatuses having protective covers, and more particularly to a display apparatus suitable as a liquid-crystal display apparatus.

2. Description of the Background Art

For a display apparatus intended for outdoor use, e.g. a liquid-crystal display apparatus using liquid crystal, it is necessary to protect the display panel from external shock and rainwater. Accordingly, the display surface of the display panel is often covered by a transparent resin or glass protective cover, and the periphery of the protective cover is further waterproofed.

When a protective cover is provided over the display surface of a display panel, an air layer exists between the display panel and the protective cover. Then, the external light entering the display surface reflects at the front and back surfaces of the transparent protective cover and at the surface of the display panel as a flat panel. This degrades visibility.

In some image display apparatuses, in order to solve the deterioration of visibility, the gap between the display panel and the protective cover is filled with transparent resin, or a light-transmitting adhesive sheet (hereinafter referred to also as "a transparent adhesive sheet") is provided there (for example, see Japanese Patent Application Laid-Open No. 2006-290960).

When the gap between the display panel and the protective cover is filled with transparent resin, the display quality deteriorates as the transparent resin deteriorates with age. For example, when the transparent resin is ultraviolet cured resin, it will be yellowed with age deterioration due to ultraviolet (UV) radiation and the display quality deteriorates.

When a transparent adhesive sheet is provided, age deterioration is not likely to occur, but bubbles are included when the transparent adhesive sheet is bonded. A frame is provided to cover the periphery of the display surface of the display panel, and so there is a step height between the frame and the display surface of the display panel. Accordingly, when a transparent adhesive sheet is provided between the display panel and the protective cover, bubbles will be included in the vicinities of the step height between the frame and the display surface of the display panel, when the transparent adhesive sheet is bonded to the display panel. This considerably degrades display quality.

It is necessary, in order to prevent the inclusion of bubbles, to provide the transparent adhesive sheet only on the display surface of the display panel. However, when the transparent adhesive sheet is provided only on the display surface of the display panel, then the frame, the display panel, and the protective cover cannot be fixed, which lowers shock resistance of the display apparatus.

Japanese Patent Application Laid-Open No. 2009-116297 (hereinafter referred to as patent document) discloses a technique for preventing the inclusion of bubbles without lowering the shock resistance of the display apparatus. In the display apparatus disclosed in this patent document, two transparent adhesive sheets are provided in the gap between the display surface of the display panel and the protective cover. One of the transparent adhesive sheets is provided within the opening of the frame and bonded to the display surface of the display panel. The other transparent adhesive sheet bonds and fixes the transparent adhesive sheet within the opening of the frame, the frame, and the protective cover.

In the display apparatus disclosed in this patent document, one of the two transparent adhesive sheets, the one provided within the opening of the frame, must be positioned such that it does not extend over the opening edges of the frame and such that a gap of a certain or more distance does not remain between the opening edges of the frame and the transparent adhesive sheet. If the transparent adhesive sheet extends over the opening edges of the frame, a step height forms at the opening edges of the frame and bubbles will be included. Also, if there is a certain or more distance between the transparent adhesive sheet and the opening edges of the frame, the edges of the transparent adhesive sheet will be exposed and visually recognized from the opening of the frame, degrading the display quality.

In order to prevent the transparent adhesive sheet within the opening of the frame from extending over the opening edges of the frame, the dimensions of the transparent adhesive sheet must be formed smaller than the opening of the frame such that it will not extend over the opening of edges of the frame. Positioning such a transparent adhesive sheet without a gap between it and the opening edges of the frame requires strict control of the dimensions of the transparent adhesive sheet and the opening of the frame, and the work of positioning the transparent adhesive sheet takes time and effort. Accordingly, the technique disclosed in this patent document has room for improvement.

SUMMARY OF THE INVENTION

An object of the present invention is to provide a display apparatus that realizes high display quality without inclusion of bubbles when a protective cover is bonded over the display surface of the display panel with a transparent adhesive sheet therebetween.

A display apparatus according to the present invention includes a display panel, a frame, a protective cover, first and second transparent adhesive sheets, and a bonding member.

The display panel has a display surface for displaying an image.

The frame has an opening formed in a position corresponding to the display surface. The frame holds the display panel, with the display surface exposed through the opening, while opening edges defining the opening cover a periphery of the display surface.

The protective cover has a light transmitting property. The protective cover is positioned to cover the display surface exposed through the opening formed in the frame, so as to protect the display surface.

The first and second transparent adhesive sheets have a light transmitting property. The first and second transparent adhesive sheets are provided in a gap between the display surface and the protective cover, so as to bond the display surface and the protective cover.

The bonding member is charged in a gap formed by the frame, the display panel, the first transparent adhesive sheet, and the second transparent adhesive sheet, so as to bond the frame, the display panel, the first transparent adhesive sheet, and the second transparent adhesive sheet.

The first transparent adhesive sheet is provided in contact with the display surface in the opening formed in the frame. The first transparent adhesive sheet has a thickness dimension that is formed equal to or larger than a thickness dimension of the opening edges of the frame, and has a cross-sectional area vertical to a thickness direction that is formed smaller than an opening area of the opening.

The second transparent adhesive sheet is provided in contact with the first transparent adhesive sheet and the protective cover. The second transparent adhesive sheet has a cross-sectional area vertical to the thickness direction that is formed larger than the opening area of the opening formed in the frame.

According to the display apparatus above, a display apparatus with high display quality is obtained.

A display apparatus according to the present invention includes a display panel, a frame, a protective cover, a transparent adhesive sheet, and a bonding member.

The display panel has a display surface for displaying an image.

The frame has an opening formed in a position corresponding to the display surface. The frame holds the display panel, with the display surface exposed through the opening, while opening edges defining the opening cover a periphery of the display surface.

The protective cover has a light transmitting property. The protective cover is positioned to cover the display surface exposed through the opening formed in the frame, so as to protect the display surface.

The transparent adhesive sheet has a light transmitting property. The transparent adhesive sheet is provided in a gap between the display surface and the protective cover, so as to bond the display surface and the protective cover.

The bonding member is charged in a gap formed by the frame, the display panel, the transparent adhesive sheet, and the protective cover, so as to bond the frame, the display panel, the transparent adhesive sheet, and the protective cover.

The transparent adhesive sheet is provided in contact with the protective cover and also in contact with the display surface in the opening formed in the frame. The transparent adhesive sheet has a thickness dimension that is formed larger than a thickness dimension of the opening edges of the frame, and has a cross-sectional area vertical to a thickness direction that is formed smaller than an opening area of the opening.

According to the display apparatus above, a display apparatus with high display quality is obtained. Also, the material costs and assembling work are reduced, and thus manufacturing costs are reduced. Also, a display apparatus with high shock resistance is obtained.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
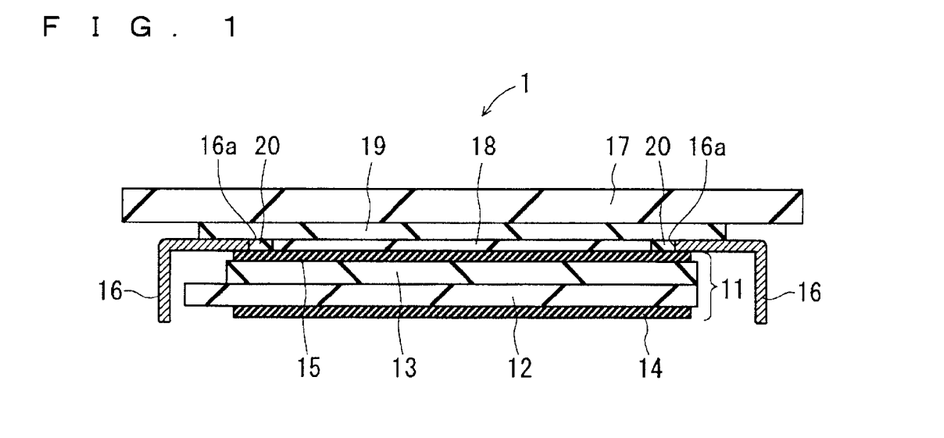
FIG. 1 is a cross-sectional view illustrating the structure of a display apparatus according to a first preferred embodiment of the present invention.

FIG. 1 is a cross-sectional view illustrating the structure of a display apparatus 1 according to a first preferred embodiment of the present invention. The display apparatus 1 includes a display panel 11, a frame 16, a protective cover 17, two transparent adhesive sheets 18 and 19, i.e. a first transparent adhesive sheet 18 and a second transparent adhesive sheet 19, and a bonding member 20. In this preferred embodiment, the display apparatus 1 is a liquid-crystal display apparatus, and the display panel 11 is a liquid-crystal display panel.

The display panel 11 includes an insulating substrate 12, an opposing substrate 13, a back-side polarizer 14, and a display-side polarizer 15. Though not shown in the diagram, the surface of the insulating substrate 12 on one side of the thickness direction is provided with a TFT array, including a plurality of thin film transistors (TFTs), and the like. The opposing substrate 13 is placed opposite the insulating substrate 12 with a liquid-crystal layer (not shown) sandwiched therebetween. The back-side polarizer 14 is provided on the surface of the insulating substrate 12 on the other side of the thickness direction, in other words, it is provided on the surface of the insulating substrate 12 on the side opposite to its surface facing the opposing substrate 13. The display-side polarizer 15 is provided on the surface of the opposing substrate 13 on one side of the thickness direction, in other words, it is provided on the surface of the opposing substrate 13 on the side opposite to its surface facing the insulating substrate 12.

The display panel 11 has a display surface where images are displayed. In FIG. 1, the surface of the display panel 11 on one side of the thickness direction, specifically the surface of the opposing substrate 13 on one side of the thickness direction, corresponds to the display surface of the display panel 11. An opening 16a is formed in the frame 16 in the position corresponding to the display surface. The frame 16 exposes the display surface through the opening 16a. Also, it holds the display panel 11 while the opening edges defining the opening 16a cover the periphery of the display surface. The display panel 11 has driving circuitry for driving liquid crystal and circuit boards, but FIG. 1 does not show the driving circuitry and circuit boards in order to facilitate the understanding.

With the display panel 11, a planar light-source device (not shown) is provided on the other side of the thickness direction of the insulating substrate 12, i.e. on the lower side in FIG. 1. The frame 16 mates with the planar light-source device to form the display apparatus 1. In this preferred embodiment, the insulating substrate 12, the opposing substrate 13, the back-side polarizer 14, the display-side polarizer 15, and the opening 16a of the frame 16 have rectangular form seen from one side of the thickness direction of the display panel 11. In FIG. 1, they are placed such that the length direction corresponds to the side-to-side direction in FIG. 1. The dimension in the length direction of the opening 16a of the frame 16 (hereinafter referred to also as "a length dimension") is smaller than the length dimension of the display-side polarizer 15 of the opposing substrate 13, and the opening edges of the frame 16 are positioned on both edges in the length direction of the display-side polarizer 15.

The protective cover 17 has a light transmitting property. The protective cover 17 covers the display surface of the display panel 11 exposed through the opening 16a formed in the frame 16, so as to protect the display surface. The first and second transparent adhesive sheets 18 and 19 have a light transmitting property. The first and second transparent adhesive sheets 18 and 19 are provided in the gap between the display surface of the display panel 11 and the protective cover 17, so as to bond the display surface and the protective cover 17 together.

Specifically, on one side of the thickness direction, the first transparent adhesive sheet 18 is provided on the surface of the display-side polarizer 15 of the opposing substrate 13. The second transparent adhesive sheet 19 is provided on the surface of the first transparent adhesive sheet 18 on one side of the thickness direction. The protective cover 17 is provided on the surface of the second transparent adhesive sheet 19 on one side of the thickness direction. That is to say, the two transparent adhesive sheets 18 and 19 are provided between the surface-side polarizer 15 and the protective cover 17.

With the two transparent adhesive sheets 18 and 19, the first transparent adhesive sheet 18 has a cross-sectional area vertical to the thickness direction that is formed smaller than the opening area of the opening 16a formed in the frame 16. Also, the thickness dimension of the first transparent adhesive sheet 18 is formed equal to the thickness dimension of the edges of the frame 16 covering the periphery of the display panel 11, i.e. equal to the thickness dimension of the opening edges. Here, "equal" includes "approximately equal". The first transparent adhesive sheet 18 is provided in contact with the display surface of the display panel 11 in the opening 16a formed in the frame 16.

The second transparent adhesive sheet 19 is provided on the surface on the one side of the thickness direction, i.e. on the upper side in FIG. 1, of the first transparent adhesive sheet 18 and the frame 16. The second transparent adhesive sheet 19 has a cross-sectional area vertical to the thickness direction that is formed larger than the opening area of the opening 16a formed in the frame 16. The second transparent adhesive sheet 19 is provided in contact with the first transparent adhesive sheet 18 and the protective cover 17. The second transparent adhesive sheet 19 bonds the display-side polarizer 15 of the opposing substrate 13 and the frame 16, and the protective cover 17, with the first adhesive sheet 18 therebetween.

In this preferred embodiment, a bonding member 20 is provided in the gap formed by the frame 16, the display panel 11, the first transparent adhesive sheet 18, and the second transparent adhesive sheet 19, specifically, in the gap between the edges of the first transparent adhesive sheet 18 and the opening edges of the frame 16. The bonding member 20 is formed of a bonding material, and it bonds the frame 16, the display panel 11, the first transparent adhesive sheet 18, and the second transparent adhesive sheet 19. As the bonding material, ultraviolet (UV) cured resin is used, for example. Initially, the bonding material is in liquid form having certain viscosity, and it is hardened to certain hardness through a hardening treatment peculiar to the material, such as, typically, application of ultraviolet radiation.

The bonding member 20 is formed as follows. After bonding the first transparent adhesive sheet 18 on the display panel 11, the bonding material as the bonding member 20 is poured between the opening edges of the frame 16 and the first transparent adhesive sheet 18, so as to fill the gap. After that, the bonding material is hardened through a hardening treatment, like application of ultraviolet radiation to the bonding material, so as to form the bonding member 20. The second transparent adhesive sheet 19 and the protective cover 17 are bonded after the bonding material has been hardened to form the bonding member 20.

The material of the protective cover 17 is a material that can protect the display surface of the display panel 11 and that has a light transmitting property (hereinafter referred to also as "transparency"), and it can be an insulating material such as glass or acrylic resin. Using an anti-reflective coated glass plate as the protective cover 17 is more preferable. A touch panel can also be used as the protective cover 17.

According to this preferred embodiment, the first transparent adhesive sheet 18 has a cross-sectional area vertical to the thickness direction that is formed smaller than the opening area of the opening 16a of the frame 16, so that a gap forms between the first transparent adhesive sheet 18 and the opening edges of the frame 16. Including this gap, the gap formed by the first transparent adhesive sheet 18, the second transparent adhesive sheet 19, the frame 16, and the display panel 11 is filled with the bonding material 20, which prevents the presence of an air layer between the display panel 11 and the protective cover 17. In other words, the first transparent adhesive sheet 18 can be formed small such that the first transparent adhesive sheet 18 will not extend over the step height between the opening edges of the frame 16 and the periphery of the display surface of the display panel 11, or specifically, its cross-sectional area vertical to the thickness direction can be formed smaller than the opening area of the opening 16a of the frame 16, without the presence of an air layer between the display panel 11 and the protective cover 17.

This enhances the workability of the process of placing the first transparent adhesive sheet 18 on the display panel 11, and the first transparent adhesive sheet 18 can be easily placed on the display panel 11 within the opening of the frame 16, without the first transparent adhesive sheet 18 extending over the step height between the opening edges of the frame 16 and the periphery of the display surface of the display panel 11. That is to say, it is possible to prevent the first transparent adhesive sheet 18 from extending over the step height between the opening edges of the frame 16 and the periphery of the display surface of the display panel 11, and it is thus possible to prevent formation of bubbles in the vicinities of the step height. Also, as stated above, it is possible to prevent the formation of an air layer between the display panel 11 and the protective cover 17, and so it is possible to prevent reflection of external light entering the display surface of the display panel 11, so as to prevent the deterioration of visibility. Thus, a display apparatus 1 with high display quality is obtained.

In this way, in this preferred embodiment, the gap formed between the first transparent adhesive sheet 18 and the opening edges of the frame 16 is filled by the bonding member 20. Accordingly, no gap remains even in positions of complex shape, such as at the step height formed by the frame 16, and a flat surface can be realized. This prevents inclusion of bubbles. Accordingly, a display apparatus 1 realizing high display quality without inclusion of bubbles is obtained.

Second Preferred Embodiment

Figure 2:
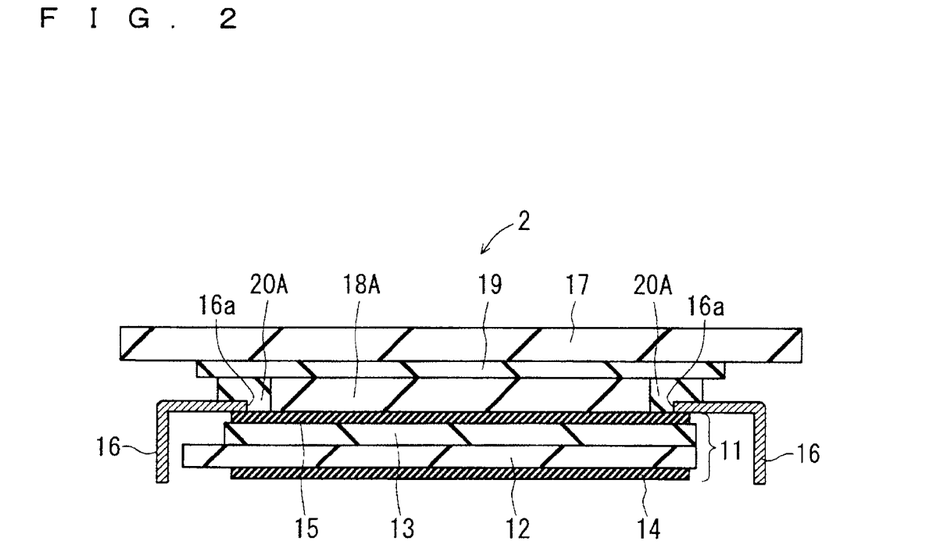
FIG. 2 is a cross-sectional view illustrating the structure of a display apparatus according to a second preferred embodiment of the present invention.

FIG. 2 is a cross-sectional view illustrating the structure of a display apparatus 2 according to a second preferred embodiment of the present invention. The structure of the display apparatus 2 of this preferred embodiment is similar to that of the display apparatus 1 of the above-described first preferred embodiment. The structure is similar to that of the display apparatus 1 except for a first transparent adhesive sheet 18A, and so differences only will be described and corresponding components are shown with the same reference characters and not described again here.

In the above-described first preferred embodiment, as shown in FIG. 1, in order to prevent formation of bubbles, the second transparent adhesive sheet 19 is bonded after eliminating step height by making flat the surface defined by the first transparent adhesive sheet 18 and the frame 16. Specifically, the first transparent adhesive sheet 18 is formed smaller than the opening 16a of the frame 16, and the thickness dimension of the first transparent adhesive sheet 18 is made equal to the thickness dimension of the frame 16, and the gap between the first transparent adhesive sheet 18 and the frame 16 is filled with the bonding material 20. Accordingly, the first preferred embodiment requires forming the thickness dimension of the first transparent adhesive sheet 18 equal to the thickness dimension of the frame 16.

This restriction of forming the thickness dimensions equal considerably narrows the margin of dimension control of the first transparent adhesive sheet 18 and the frame 16. This also adds restrictions to the design of the display apparatus 1 and narrows the range of application. Also, to prevent the bonding member 20 from forming step height, the height of the bonding material 20 from the surface of the display panel 11 on one side of the thickness direction (hereinafter also referred simply as "height") has to be equal to the height of the first transparent adhesive sheet 18 and the frame 16, i.e. equal to the thickness dimension of the first transparent adhesive sheet 18 and the frame 16. To make the heights equal, the height of the bonding member 20 must be controlled by, e.g. adjusting the amount of the applied bonding material. This increases the number of process steps as a result. Accordingly, this preferred embodiment adopts the structure shown below.

In this preferred embodiment, as shown in FIG. 2, while the first transparent adhesive sheet 18A is placed on the surface, on one side of the thickness direction, of the display-side polarizer 15 as the display surface of the display panel 11, its cross-sectional area vertical to the thickness direction is formed smaller than the opening area of the opening 16a of the frame 16, and its thickness dimension is formed larger than the thickness dimension of the frame 16, specifically larger than the thickness dimension of the opening edges of the frame 16.

In this way, the thickness dimension of the first transparent adhesive sheet 18A is larger than the thickness dimension of the opening edges of the frame 16, so that, when the second transparent adhesive sheet 19 is bonded to the first transparent adhesive sheet 18A, the second transparent adhesive sheet 19 is bonded to the first transparent adhesive sheet 18A and the protective cover 17, but not bonded to the frame 16. That is to say, when the second transparent adhesive sheet 19 is bonded, there is a gap between the second transparent adhesive sheet 19 and the frame 16. Accordingly, a bonding material as a bonding member 20A can be poured from the gap formed between the second transparent adhesive sheet 19 and the frame 16.

After the display panel 11, the first transparent adhesive sheet 18A, the second transparent adhesive sheet 19 and the protective cover 17 have been bonded together, the bonding material as the bonding member 20A is poured from the above-mentioned gap, whereby the bonding member 20A fills the gap formed by the frame 16, the first transparent adhesive sheet 18A, the second transparent adhesive sheet 19, the display panel 11, and the protective cover 17. In this way, in this preferred embodiment, the bonding member 20A is charged into the gap formed by the frame 16, the first transparent adhesive sheet 18A, the second transparent adhesive sheet 19, the display panel 11, and the protective cover 17.

Thus, according to this preferred embodiment, the bonding member 20A is charged into the gap formed by the frame 16, the first transparent adhesive sheet 18A, the second transparent adhesive sheet 19, the display panel 11, and the protective cover 17, so that it is it not necessary to make equal the thickness dimensions of the frame 16 and the first transparent adhesive sheet 18A, which eliminates restrictions in dimension control and design. Also, since the thickness dimension of the first transparent adhesive sheet 18 A is formed larger than the thickness dimension of the opening edges of the frame 16, a gap is formed between the second transparent adhesive sheet 19 and the frame 16. The bonding material as the bonding member 20A can be poured from the gap between the second transparent adhesive sheet 19 and the frame 16.

Thus, according to this preferred embodiment, after the first transparent adhesive sheet 18A, the second transparent adhesive sheet 19 and the protective cover 17 have been bonded to the display panel 11, the bonding material as the bonding member 20A is poured to fill the gap formed by the display panel 11, the first transparent adhesive sheet 18A, the second transparent adhesive sheet 19, and the protective cover 17. This eliminates the need for the control of the height of the bonding member 20A and improves the working efficiency.

Third Preferred Embodiment

Figure 3:
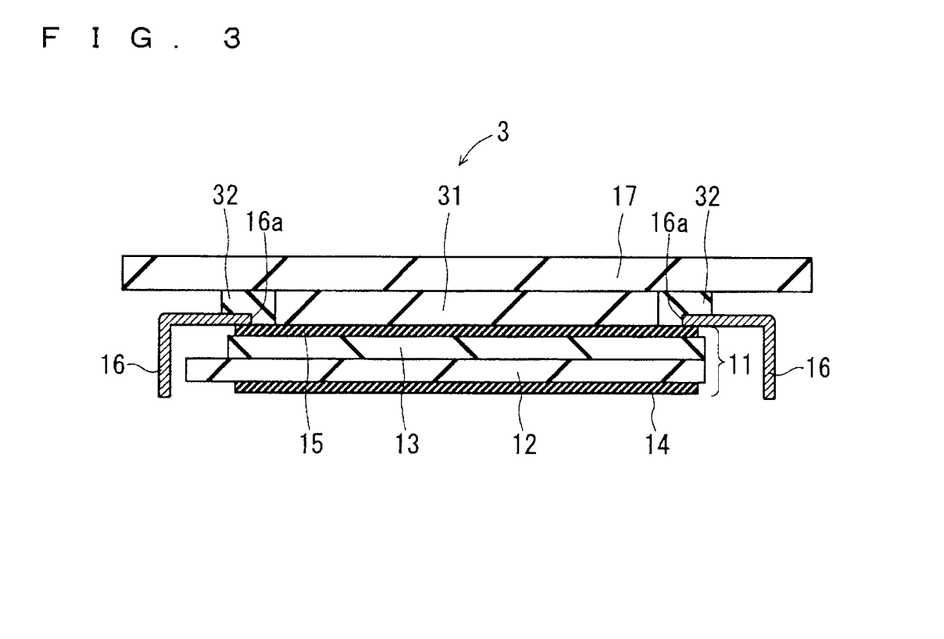
FIG. 3 is a cross-sectional view illustrating the structure of a display apparatus according to a third preferred embodiment of the present invention.

FIG. 3 is a cross-sectional view illustrating the structure of a display apparatus 3 according to a third preferred embodiment of the present invention. The structure of the display apparatus 3 of this preferred embodiment is similar to those of the display apparatuses 1 and 2 of the above-described first and second preferred embodiments. The structure is similar to those of the display apparatuses 1 and 2 except for a transparent adhesive sheet 31 and a bonding member 32, and so differences only will be described and components corresponding to those of the display apparatuses 1 and 2 are shown with the same reference characters and not described again here.

According to the above-described first and second preferred embodiments, two transparent adhesive sheets, i.e. the first transparent adhesive sheet 18, 18A and the second transparent adhesive sheet 19, are provided to prevent formation of bubbles. Such structures having two transparent adhesive sheets have room for improvement from the aspect of material costs, assembling work, and manufacturing costs. Accordingly, in this preferred embodiment, the structure has only a single transparent adhesive sheet in order to avoid increased material costs and assembling work, and to avoid increased manufacturing costs due to the increased material costs and assembling work.

In this preferred embodiment, as shown in FIG. 3, a single transparent adhesive sheet 31 is provided between the protective cover 17 and the surface, on one side of the thickness direction, of the display-side polarizer 15 as the display surface of the display panel 11. The transparent adhesive sheet 31 is formed similarly to the first transparent adhesive sheet 18 A of the second preferred embodiment. Specifically, the transparent adhesive sheet 31 has a cross-sectional area vertical to the thickness direction that is formed smaller than the opening area of the opening 16a of the frame 16, and its thickness dimension is formed larger than the thickness dimension of the frame 16, i.e. larger than the thickness dimension of the opening edges of the frame 16. That is to say, the display apparatus 3 of this preferred embodiment corresponds to a structure in which the second transparent adhesive sheet 19 has been removed from the display apparatus 2 of the second preferred embodiment.

The transparent adhesive sheet 31 is bonded to the display panel 11 and the protective cover 17. The thickness dimension of the transparent adhesive sheet 31 is larger than the thickness dimension of the frame 16, so that a gap is formed between the frame 16 and the protective cover 17 when the display panel 11, the transparent adhesive sheet 31 and the protective cover 17 are bonded together. Accordingly, a bonding material as a bonding member 32 can be poured from the gap formed between the frame 16 and the protective cover 17.

After the display panel 11, the transparent adhesive sheet 31 and the protective cover 17 have been bonded together, the bonding material as the bonding member 32 can be poured from the above-mentioned gap, whereby the bonding member 32 fills the gap formed by the display panel 11, the transparent adhesive sheet 31, the protective cover 17, and the frame 16. Thus, in this preferred embodiment, the bonding member 32 is charged into the gap formed by the display panel 11, the transparent adhesive sheet 31, the protective cover 17, and the frame 16.

According to this preferred embodiment, similarly to the above-described first and second preferred embodiments, no gap remains even in positions of complex shape, such as at the step height formed by the frame 16, and a flat surface can be realized. This prevents inclusion of bubbles. Accordingly, a display apparatus 3 realizing high display quality without inclusion of bubbles is obtained.

According to this preferred embodiment, in contrast to the first and second preferred embodiments, the display panel 11 and the protective cover 17 can be bonded together only with the single transparent adhesive sheet 31, so that the material costs and assembling work can be reduced. This reduces manufacturing costs. That is to say, according to this preferred embodiment, a display apparatus 3 with high display quality is obtained while preventing formation of bubbles in the vicinities of the step height between the periphery of the display surface of the display panel 11 and the opening edges of the frame 16, without increasing the manufacturing costs due to increased material costs and increased assembling work.

Also, in this preferred embodiment, the display panel 11, the frame 16 and the protective cover 17 are simultaneously bonded with the bonding member 32, so that components are less likely to shift due to, e.g. creep of the transparent adhesive sheet. Accordingly, a display apparatus 3 with high shock resistance is obtained.

Fourth Preferred Embodiment

Figure 4:
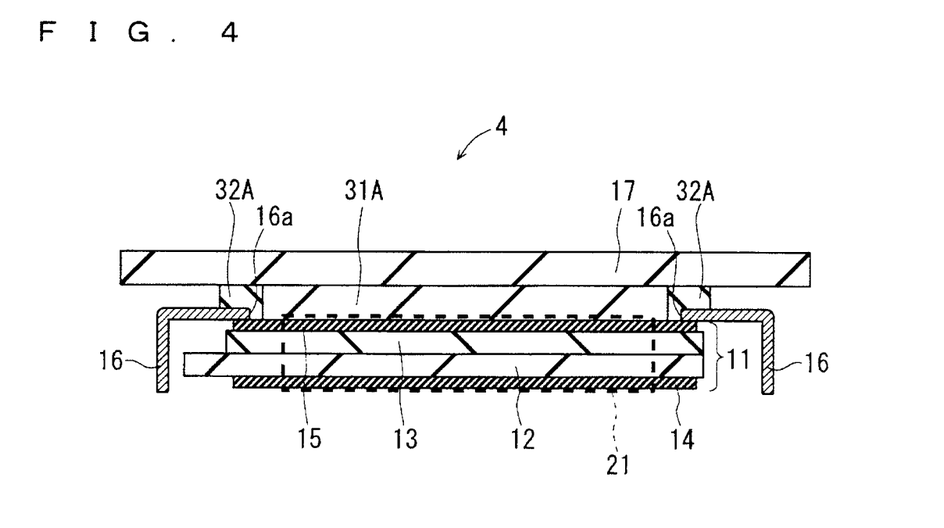
FIG. 4 is a cross-sectional view illustrating the structure of a display apparatus according to a fourth preferred embodiment of the present invention.

FIG. 4 is a cross-sectional view illustrating the structure of a display apparatus 4 according to a fourth preferred embodiment of the present invention. The structure of the display apparatus 4 of this preferred embodiment is similar to that of the display apparatus 3 of the above-described third preferred embodiment. The structure is similar to that of the display apparatus 3 except for a transparent adhesive sheet 31A and a bonding member 32A, and so differences only will be described and corresponding components are shown with the same reference characters and not described again here.

The above-described third preferred embodiment shown in FIG. 3 does not mention the positional relation between the region where the bonding member 32 is provided and the display portion 21 of the display panel 11. In this preferred embodiment, the region where the bonding member 32A is provided is limited to a region other than the display portion 21 of the display panel 11. That is to say, in this preferred embodiment, the bonding member 32A is provided in a region excepting the display portion 21 of the display panel 11. More specifically, the bonding member 32A is provided in a region other than the display portion 21, i.e. in a region excepting the display portion 21 in the display surface of the display panel 11.

The bonding member 32A is formed by hardening a bonding material as the bonding member 32A by applying a hardening treatment peculiar to the bonding material. Accordingly, it may deteriorate after formed due to influences from outside. For example, UV cured resin that can be the bonding material as the bonding member 32A deteriorates with ultraviolet radiation contained in sunlight, and it may become hardened more than necessary or the material itself may be yellowed. If the bonding member 32A is formed in the display portion 21 with UV cured resin, the UV cured resin will deteriorate with age and cause defective display because of hardening and yellowing.

Accordingly, in this preferred embodiment, as mentioned above, the region where the bonding member 32A is provided is limited to a region other than the display portion 21 of the display panel 11. In this preferred embodiment, the region of the display panel 11 surrounded by broken line in FIG. 4 is assumed to be the display portion 21. The "display portion" means a portion of the display panel 11 that is used to display images, i.e. a portion where images are actually displayed.

In this preferred embodiment, as shown in FIG. 4, while the transparent adhesive sheet 31A is provided on the surface, on one side of the thickness direction, of the display-side polarizer 15 as the display surface of the display panel 11, its cross-sectional area vertical to the thickness direction is formed larger than the area of the display surface included in the display portion 21 so that the bonding member 32A is provided in a region excepting the display portion 21 of the display panel 11. The transparent adhesive sheet 31A is formed similarly to the transparent adhesive sheet 31 of the third preferred embodiment except that its cross-sectional area vertical to the thickness direction is formed larger than the area of the display surface included in the display portion 21. That is to say, the cross-sectional area of the transparent adhesive sheet 31A that is vertical to the thickness direction is formed smaller than the opening area of the opening 16a formed in the frame 16, and larger than the area of the display surface included in the display portion 21. Also, the thickness dimension of the transparent adhesive sheet 31A is formed larger than the thickness dimension of the frame 16, specifically larger than the thickness dimension of the opening edges of the frame 16.

The transparent adhesive sheet 31A is provided to cover the display portion 21. More specifically, the transparent adhesive sheet 31A is positioned such that the edges of the transparent adhesive sheet 31A, to be more precise, the peripheries of the transparent adhesive sheet 31A, are positioned between the display portion 21 and the opening edges of the frame 16.

Thus, the display panel 11, the transparent adhesive sheet 31A, the protective cover 17, and the frame 16 are bonded together, with the edges of the transparent adhesive sheet 31A located between the display portion 21 and the opening edges of the frame 16. The bonding material is poured into the gap thus formed to form the bonding member 32A. The bonding member 32A thus formed is positioned outside of the display portion 21 of the display panel 11 surrounded by broken line. In this way, the bonding member 32A is provided in a region other than the display portion 21 of the display panel 11.

According to this preferred embodiment, the transparent adhesive sheet 31A has a cross-sectional area vertical to the thickness direction that is formed smaller than the opening area of the opening 16a formed in the frame 16 and larger than the area of the display surface included in the display portion 21, and the transparent adhesive sheet 31A is provided to cover the display portion 21. Thus, the bonding member 32A can be positioned outside of the display portion 21 of the display panel 11, i.e. in a region other than the display portion 21 of the display panel 11.

Thus, the bonding member 32A is positioned in a region other than the display portion 21 of the display panel 11, whereby, even when the bonding member 32A is made of a material susceptible to deterioration due to external influences, like UV cured resin, and even when the bonding member 32A deteriorates in long-term use, the deteriorated bonding member 32A does not cause defects like inferior display. Accordingly, a display apparatus 4 realizing high display quality even in long-term use is obtained.

This preferred embodiment has described a structure in which the bonding member 32 is provided in a region other than the display portion 21 of the display panel 11 in the display apparatus 3 of the above-described third preferred embodiment shown in FIG. 3, by way of illustration and not of limitation. For example, also in the display apparatus 1 of the first preferred embodiment shown in FIG. 1, and also in the display apparatus 2 of the second preferred embodiment shown in FIG. 2, it is preferable to position the bonding member 20, 20A in a region other than the display portion 21 of the display panel 11 as in this preferred embodiment. Then the same effects as those of this preferred embodiment are obtained.

Modification of the Fourth Preferred Embodiment

Figure 5:
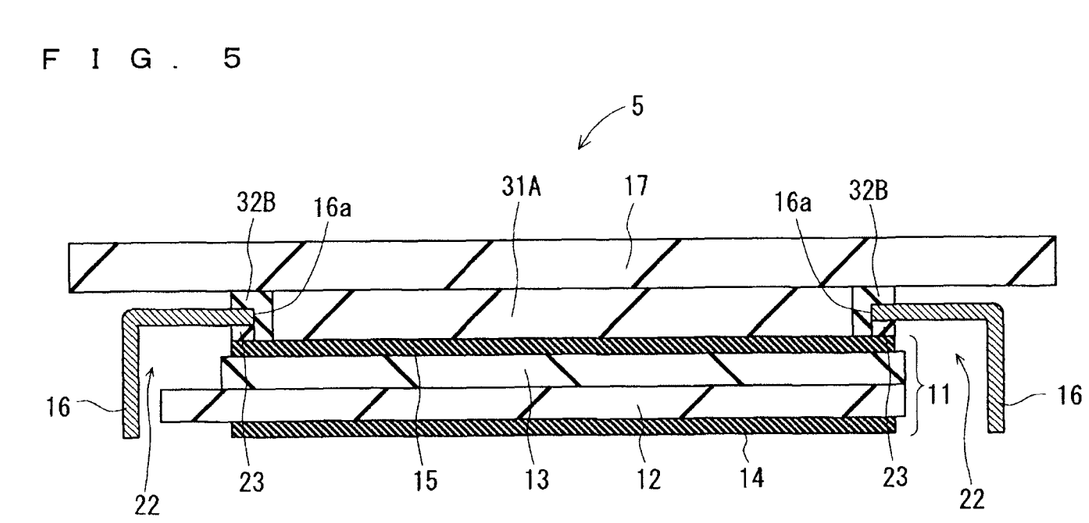
FIG. 5 is a cross-sectional view illustrating the structure of a display apparatus according to a modification of the fourth preferred embodiment of the present invention.

FIG. 5 is a cross-sectional view illustrating the structure of a display apparatus 5 according to a modification of the fourth preferred embodiment of the present invention. The structure of the display apparatus 5 of this modification is similar to that of the display apparatus 4 of the above-described fourth preferred embodiment shown in FIG. 4. The structure is similar to that of the display apparatus 4 except for a bonding member 32B and a sealing member 23, and so differences only will be described and corresponding components are shown with the same reference characters and not described again here.

In the display apparatus 4 of the above-described fourth preferred embodiment shown in FIG. 4, during the formation of the bonding member 32A, the bonding material as the bonding member 32A might enter the inside of the frame 16, i.e. in FIG. 4 the lower gap inside the display apparatus (hereinafter also referred to as "the inside space of the display apparatus"), from between the frame 16 and the display panel 11, specifically from between the frame 16 and the display-side polarizer 15. The inside space of the display apparatus is shown by reference character "22" in FIG. 5, for example. When the bonding material as the bonding member 32A enters the inside space of the display apparatus, troubles like defective display will occur and the display quality of the display apparatus 4 will be degraded.

Accordingly, in the modification shown in FIG. 5, a scaling member 23 is provided between the frame 16 and the display panel 11, specifically between the opening edges of the frame 16 and the periphery of the display panel 11. The sealing member 23 provides sealing between the opening edges of the frame 16 and the periphery of the display panel 11. More specifically, the sealing member 23 is provided between the frame 16 and the display-side polarizer 15. The bonding member 32B is charged into the gap formed by the display panel 11, the transparent adhesive sheet 31A, the protective cover 17, the frame 16, and the sealing member 23.

Thus, in this modification, the sealing member 23 is provided between the frame 16 and the display-side polarizer 15 to fill the gap between the frame 16 and the display-side polarizer 15, so as to seal the gap between the opening edges of the frame 16 and the periphery of the display panel 11. This prevents the bonding material as the bonding member 32B from entering the inside space 22 of the display apparatus from between the opening edges of the frame 16 and the periphery of the display panel 11, specifically from between the frame 16 and the display-side polarizer 15. This prevents troubles like defective display, and a display apparatus 5 with high display quality is obtained.

The sealing member 23 is formed of a sealing material such as tape or resin. The sealing member 23 is formed by providing a sealing material, e.g. by bonding tape, or by applying resin, in the periphery of the display surface of the display panel 11, and then bonding the frame 16 with the sealing material therebetween. After thus forming the sealing member 23, as in the above-described fourth preferred embodiment, the protective cover 17 is bonded over the display surface of the display panel 11 with the transparent adhesive sheet 31A therebetween. In this state, a bonding material as the bonding member 32B is poured and hardened, so as to form the bonding member 32B in the gap formed by the display panel 11, the transparent adhesive sheet 31A, the protective cover 17, the frame 16, and the sealing member 23.

This modification has described a structure in which the sealing member 23 is provided between the frame 16 and the display panel 11 in the display apparatus 4 of the above-described fourth preferred embodiment shown in FIG. 4, by way of illustration and not of limitation. For example, also in the display apparatuses 1 to 3 of the above-described first to third preferred embodiments shown in FIGS. 1 to 3, it is preferable to provide a sealing member between the frame 16 and the display panel 11, specifically between the opening edges of the frame 16 and the periphery of the display panel 11, as shown in this modification. This offers the same effects as those of this modification.

The display apparatuses 1 to 5 of the above-described first to fourth preferred embodiments and modification are liquid-crystal display apparatuses and they have liquid-crystal display panels as the display panel 11, but display apparatuses are not limited to them. For example, the display apparatus may be a plasma display apparatus having a plasma display panel as the display panel 11, or may be an organic electroluminescence (EL) display apparatus having an organic EL panel as the display panel 11, for example.

While the invention has been described in detail, the foregoing description is in all aspects illustrative and not restrictive. It is understood that numerous other modifications and variations can be devised without departing from the scope of the invention.

What is claimed is:

1. A display apparatus comprising:
   a display panel having a display surface for displaying an image;
   a frame having an opening formed in a position corresponding to said display surface, said frame holding said display panel, with said display surface exposed through said opening, while opening edges defining said opening cover a periphery of said display surface;
   a protective cover having a light transmitting property, said protective cover being positioned to cover said display surface exposed through said opening formed in said frame, so as to protect said display surface;
   first and second transparent adhesive sheets having a light transmitting property, said first and second transparent adhesive sheets being provided in a gap between said display surface and said protective cover, so as to bond said display surface and said protective cover; and a bonding member charged in a gap formed by said frame, said display panel, said first transparent adhesive sheet, and said second transparent adhesive sheet, so as to bond said frame, said display panel, said first transparent adhesive sheet, and said second transparent adhesive sheet, said first transparent adhesive sheet being provided in contact with said display surface in said opening formed in said frame, said first transparent adhesive sheet having a thickness dimension that is formed equal to or larger than a thickness dimension of said opening edges of said frame, and having a cross-sectional area vertical to a thickness direction that is formed smaller than an opening area of said opening, said second transparent adhesive sheet being provided in contact with said first transparent adhesive sheet and said protective cover, said second transparent adhesive sheet having a cross-sectional area vertical to the thickness direction that is formed larger than the opening area of said opening formed in said frame.

2. The display apparatus according to claim 1, wherein the thickness dimension of said first transparent adhesive sheet is formed larger than the thickness dimension of said opening edges of said frame.

3. The display apparatus according to claim 1, wherein said first transparent adhesive sheet has the cross-sectional area vertical to said thickness direction that is formed smaller than the opening area of said opening, and that is formed larger than an area of said display surface included in a display portion of said display panel that is used to display an image, and said first transparent adhesive sheet is provided to cover said display portion.

4. A display apparatus comprising:
a display panel having a display surface for displaying an image;
a frame having an opening formed in a position corresponding to said display surface, said frame holding said display panel, with said display surface exposed through said opening, while opening edges defining said opening cover a periphery of said display surface;
a protective cover having a light transmitting property, said protective cover being positioned to cover said display surface exposed through said opening formed in said frame, so as to protect said display surface;
a transparent adhesive sheet having a light transmitting property, said transparent adhesive sheet being provided in a gap between said display surface and said protective cover, so as to bond said display surface and said protective cover; and
a bonding member charged in a gap formed by said frame, said display panel, said transparent adhesive sheet, and said protective cover, so as to bond said frame, said display panel, said transparent adhesive sheet, and said protective cover,
said transparent adhesive sheet being provided in contact with said protective cover and also in contact with said display surface in said opening formed in said frame, said transparent adhesive sheet having a thickness dimension that is formed larger than a thickness dimension of said opening edges of said frame, and having a cross-sectional area vertical to a thickness direction that is formed smaller than an opening area of said opening.

5. The display apparatus according to claim 4, wherein said transparent adhesive sheet has the cross-sectional area vertical to said thickness direction that is formed smaller than the opening area of said opening, and that is formed larger than an area of said display surface included in a display portion of said display panel that is used to display an image, and said transparent adhesive sheet is provided to cover said display portion.

6. The display apparatus according to claim 1, further comprising a sealing member that seals a gap between said opening edges of said frame and said periphery of said display panel.

7. The display apparatus according to claim 4, further comprising a sealing member that seals a gap between said opening edges of said frame and said periphery of said display panel.

* * * * *